UNITED STATES PATENT OFFICE.

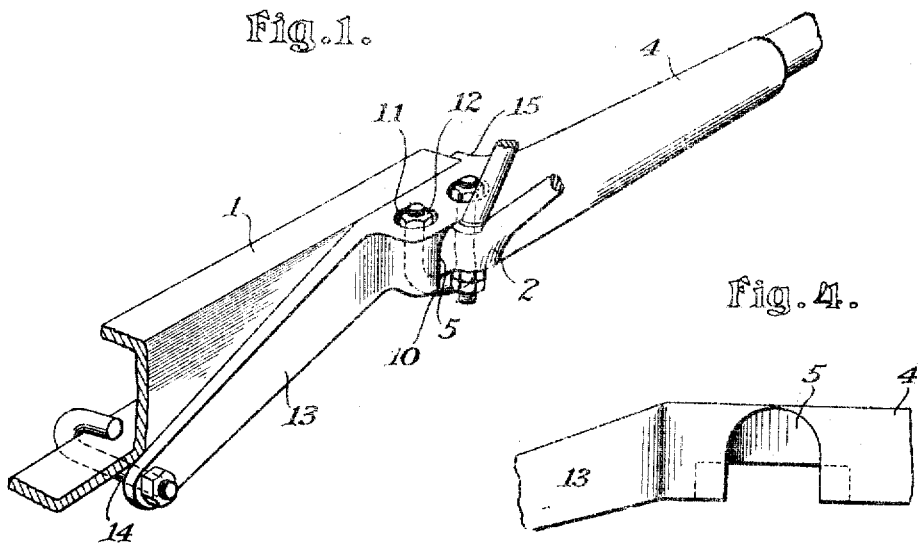
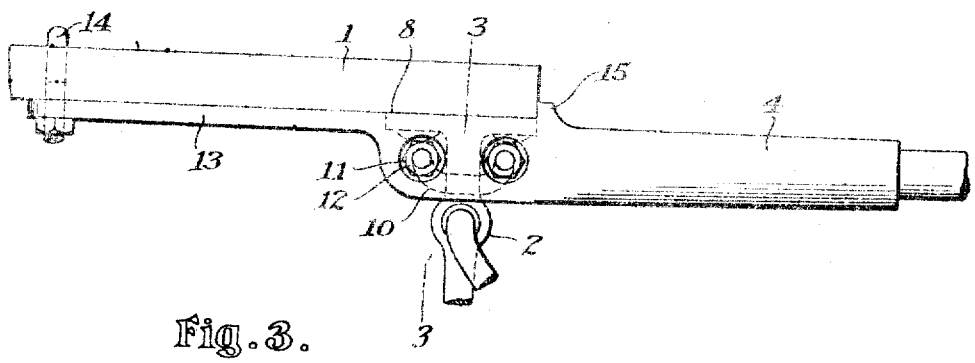
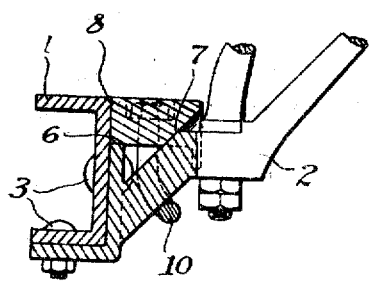

CLINTON M. SAGER, OF ROCHESTER, NEW YORK, ASSIGNOR TO J. H. SAGER COMPANY, OF ROCHESTER, NEW YORK, A CORPORATION.

CONNECTION BETWEEN AUTOMOBILE-BUMPERS AND VEHICLE-FRAMES.

1,274,086. Specification of Letters Patent. Patented July 30, 1918.

Original application filed April 13, 1917, Serial No. 161,694. Divided and this application filed May 21, 1917. Serial No. 170,047.

*To all whom it may concern:*

Be it known that I, CLINTON M. SAGER, a citizen of the United States, and resident of Rochester, in the county of Monroe and State of New York, have invented certain new and useful Improvements in Connections Between Automobile-Bumpers and Vehicle-Frames, of which the following is a specification.

The present invention relates to connections between automobile bumpers and vehicle frames of the type in which the vehicle frame embodies a frame bar extending longitudinally of the automobile along one side thereof and formed of channel iron, the channel being disposed inwardly and a lamp or other bracket being secured to the side of the frame bar near the forward end thereof and extending outwardly and upwardly from the bar. An object of this invention is to provide a connection which may be rigidly secured to the frame bar without the necessity of perforating said bar or interfering with the bracket.

To this and other ends, the invention consists of certain parts and combinations of parts all of which will be hereinafter described, the novel features being pointed out in the appended claims.

In the drawings:—

Figure 1 is a perspective view of the inner end of the bumper supporting arm, showing the connection of the latter to the side frame bar of a motor vehicle of the type known as the "Ford" car;

Fig. 2 is a plan view of the inner end of the bumper supporting arm and the frame bar of the motor vehicle;

Fig. 3 is a section on the line 3—3, Fig. 2; and

Fig. 4 is a fragmentary side elevation.

This application is a division of an application filed by me on the 13th day of April, 1917, Serial No. 161,694.

Referring more particularly to the drawings, 1 indicates one of the side frame bars of a motor vehicle of the type known as the "Ford" car. In such a vehicle it is customary to employ a bracket 2 secured to the side bar 1 near the forward end in any suitable manner, as by rivets 3, the said bracket serving as a support for a lamp and for a mud or splash guard. This projecting bracket makes the securing of an automobile bumper to the Ford car a difficult problem, as it lies in the horizontal plane of the vehicle frame bar to one side of the latter. In this invention, this problem is overcome by providing the bumper supporting arm 4 (there being preferably two of such arms one on each side of the vehicle connected to the bumper bar, not shown) with a recess 5 on its under side permitting the bumper supporting arm to straddle the bracket 2 to coöperate at 6 and 7 with the upper side of the bracket, while, at the same time, permitting the vertical face 8 of the bumper supporting arm to lie in contact or abutment with the vertical face of the side bar 1. The face 7 which is inclined to the vertical coöperates with a similarly inclined face on the bracket, and tends to force the face 8 in contact with the side bar 1.

To maintain firm contact of the bumper supporting arm with the bracket and the side bar 1, there is employed a device which preferably connects with the bracket, and is in the form of a U-shaped clip 10 surrounding the bracket 2 and passing through the bumper supporting arm 4, the latter being provided with two openings for receiving the arms of the clip, said openings being enlarged at 11 at their upper ends to provide pockets for the reception of the nuts 12 on the ends of the clip 10.

The bumper supporting arm 4 is extended rearwardly and downwardly from the bracket 2 by an arm 13 which bears against the vertical face of the side bar 1, and projects slightly below the latter. At its free end this extension arm 13 carries means for fastening said bumper arm to the side bar 1. In this instance, this means is in the form of a clip or hook bolt 14 secured to the arm 13 and engaging about the lower flange of the side frame bar 1.

With the end in view of removing the longitudinal thrusts of the bumper supporting arm 4 from the bracket 2, the arm 4 has a projection 15 in advance of the bracket receiving recess, said projection having a shoulder or abutment coöperating with the forward end of the frame bar 1.

From the foregoing it will be seen that there has been provided a connection between a bumper supporting arm and the vehicle frame bar which will permit the bumper supporting arm to lie in firm contact with the side face of the vehicle frame bar, while utilizing the forward end of said bar for an abutment for receiving the force of blows imposed upon the bumper supporting arm in the direction of the length of said arm. The bracket which usually carries the lamp or has the mud or splash guard secured thereto, is utilized to secure the bumper supporting arm, and at the same time to act as a support for said arm. The securing of the bumper supporting arm in rear of the lamp bracket to prevent the supporting arm turning on the bracket as a fulcrum, is obtained by a device preferably in the form of a hooked bolt which connects with the vehicle frame bar in such a manner that the perforation of the bar is unnecessary.

What I claim as my invention and desire to secure by Letters Patent is:—

1. The combination with a vehicle frame bar; and a bracket secured to said bar and projecting laterally therefrom; of a bumper supporting arm having a lateral projection engaging the forward end of said vehicle frame bar, said bumper supporting arm lying above the bracket in contact with the vertical side face of the vehicle frame bar and having a recess on its under side forming a seat resting against said bracket and also having a portion extending rearwardly from said seat in contact with the side face of the vehicle frame bar; a clip carried by the bumper supporting arm and engaging said bracket, and a clip carried by said rearwardly-extending portion of the bumper supporting arm and engaging with the vehicle frame bar.

2. The combination with a vehicle frame bar of channel form with the channel facing inwardly; and a bracket secured thereto and extending outwardly therefrom; of a bumper supporting arm having an abutment for coöperating with the forward end of the vehicle frame bar, said bumper supporting arm lying above the bracket in contact with the side face of the vehicle frame bar having a recess in its under side forming a seat resting against said bracket and having also a portion extending rearwardly from the bracket and contacting with the side face of the vehicle frame bar; means utilizing said bracket as an anchor for securing the seat of the arm against the bracket; and means carried by said rearwardly-extending portion, extending laterally from said portion under the vehicle frame bar in engagement with the lowermost flange of said bar.

CLINTON M. SAGER.